(12) United States Patent
Chen et al.

(10) Patent No.: US 10,261,996 B2
(45) Date of Patent: Apr. 16, 2019

(54) CONTENT LOCALIZATION USING FALLBACK TRANSLATIONS

(71) Applicant: Dropbox, Inc., San Francisco, CA (US)

(72) Inventors: Zhongbo Chen, San Francisco, CA (US); James Leszczenski, San Francisco, CA (US); David Mann, Belmont, CA (US); Atsushi Yamaguchi, Palo Alto, CA (US)

(73) Assignee: Dropbox, Inc., San Francisco, CA (US)

( * ) Notice: Subject to any disclaimer, the term of this patent is extended or adjusted under 35 U.S.C. 154(b) by 507 days.

(21) Appl. No.: 14/578,073

(22) Filed: Dec. 19, 2014

(65) Prior Publication Data

US 2016/0179789 A1    Jun. 23, 2016

(51) Int. Cl.
*G06F 17/28* (2006.01)
(52) U.S. Cl.
CPC .................................. *G06F 17/289* (2013.01)
(58) Field of Classification Search
CPC ..................................................... G06F 17/289
USPC ........................................................ 715/856
See application file for complete search history.

(56) References Cited

U.S. PATENT DOCUMENTS

| | | | |
|---|---|---|---|
| 6,035,121 A * | 3/2000 | Chiu | G06F 9/4448 717/136 |
| 6,347,316 B1 | 2/2002 | Redpath | |
| 6,623,529 B1 | 9/2003 | Lakritz | |
| 6,957,425 B1 | 10/2005 | Nadon et al. | |
| 7,536,640 B2 | 5/2009 | Zhang et al. | |
| 7,904,595 B2 * | 3/2011 | Cheng | G06F 17/3089 704/8 |
| 8,239,185 B2 | 8/2012 | Johnson | |
| 8,290,950 B2 | 10/2012 | Tong | |
| 8,434,072 B2 | 4/2013 | Pawlowsky | |
| 8,468,149 B1 | 6/2013 | Lung et al. | |
| 8,635,539 B2 | 1/2014 | Young et al. | |
| 2003/0126559 A1 * | 7/2003 | Fuhrmann | G06F 9/454 715/229 |

(Continued)

OTHER PUBLICATIONS

Hojtsy, Gábor, Translation string contexts in Drupal 7—developers take note, Drupal Translations, available at https://localize.drupal.org/node/2109 (Oct. 25, 2010).*

(Continued)

*Primary Examiner* — Doon Y Chow
*Assistant Examiner* — Conrad R Pack
(74) *Attorney, Agent, or Firm* — Polsinelli PC

(57) ABSTRACT

Disclosed are systems, methods, and non-transitory computer-readable storage media for obtaining a translation of a previous version of a display item to present on a graphical user interface when a translation of a current version of the display item is unavailable. A client device can request a translation of a display item in a graphical user interface invoked by the client device. The client device can send a server a first key corresponding to the current version of the display item, a second key corresponding to a previous version of the display item, and locale information describing the current location and/or language preferences of the client device. If the server cannot obtain a translation corresponding to the first key, the server can obtain a translation of the previous version of the display item in the language associated with the locale based on the second key.

18 Claims, 6 Drawing Sheets

(56) References Cited

U.S. PATENT DOCUMENTS

| | | |
|---|---|---|
| 2004/0205118 A1* | 10/2004 | Yu ........................ G06F 17/212 709/203 |
| 2007/0050757 A1* | 3/2007 | van Woerkom ...... G06F 9/4448 717/117 |
| 2008/0195377 A1 | 8/2008 | Kato et al. |
| 2008/0270108 A1* | 10/2008 | Godoy .................. G06F 17/289 704/2 |
| 2009/0248392 A1 | 10/2009 | Talwar et al. |
| 2010/0185652 A1* | 7/2010 | Bak ....................... G06F 9/4448 707/769 |
| 2012/0016655 A1* | 1/2012 | Travieso ............. G06F 17/2827 704/2 |
| 2014/0052702 A1 | 2/2014 | Fierro et al. |
| 2014/0058719 A1 | 2/2014 | Travieso et al. |
| 2014/0172409 A1* | 6/2014 | Brunswig ............. G06F 9/4448 704/2 |
| 2014/0249797 A1 | 9/2014 | Liu et al. |

OTHER PUBLICATIONS

Austermühl, Frank, Electronic Tools for Translators, Translation Practices Explained vol. 2, Routledge, pp. i-viii, 2, 3, 4, 134, 135, 138, 142-145, and 148 (Jun. 19, 2014).*

Gey, Fredric C., et al., "Cross-Language Retrieval for the CLEF Collections—Comparing Multiple Methods of Retrieval", University of California, Berkeley, Sep. 5, 2000, pp. 1-9.

\* cited by examiner

CONTENT LOCALIZATION USING FALLBACK TRANSLATIONS

TECHNICAL FIELD

The present technology pertains to content localization in graphical user interfaces.

BACKGROUND

Applications, websites and other software present information through graphical user interfaces. The graphical user interfaces can be invoked or accessed from different locations around the world. Text and other display items generated in a first language (e.g., English) are often translated into and presented in a second language corresponding to the location or locale where the graphical user interface (GUI) is presented. Sometimes there can be delays between generating the display item in the first language and translating the display item into the second language. Thus, a translation of the display item may not be available for a locale where the graphical user interface is presented.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for obtaining a translation of a previous version of a display item to present on a graphical user interface when a translation of a current version of the display item is unavailable. In some implementations, a client device can request a translation of a display item in a graphical user interface invoked by the client device. The client device can send a server a first key corresponding to the current version of the display item. The client device can send the server a second key corresponding to a previous version of the display item. The client device can send the server locale information describing the current location and/or language preferences of the client device. The server can look up a translation of the current version of the display item in a language associated with the locale based on the first key. If a translation corresponding to the first key does not exist, the server can look up a translation of the previous version of the display item in the language associated with the locale based on the second key. Once the server obtains the translation of the previous version, the server can send the translation of the previous version to the client device. When the client device receives the translation of the previous version of the display item, the client device can present the translation of the previous version on the graphical user interface. Thus, a translated version of the display item can be presented for a locale even through a translation of the current version of the display item has not been generated or is not yet available.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for presenting a translation of a display item when a translation of the current version of the display item is unavailable or has not yet been generated.

Figure 1:
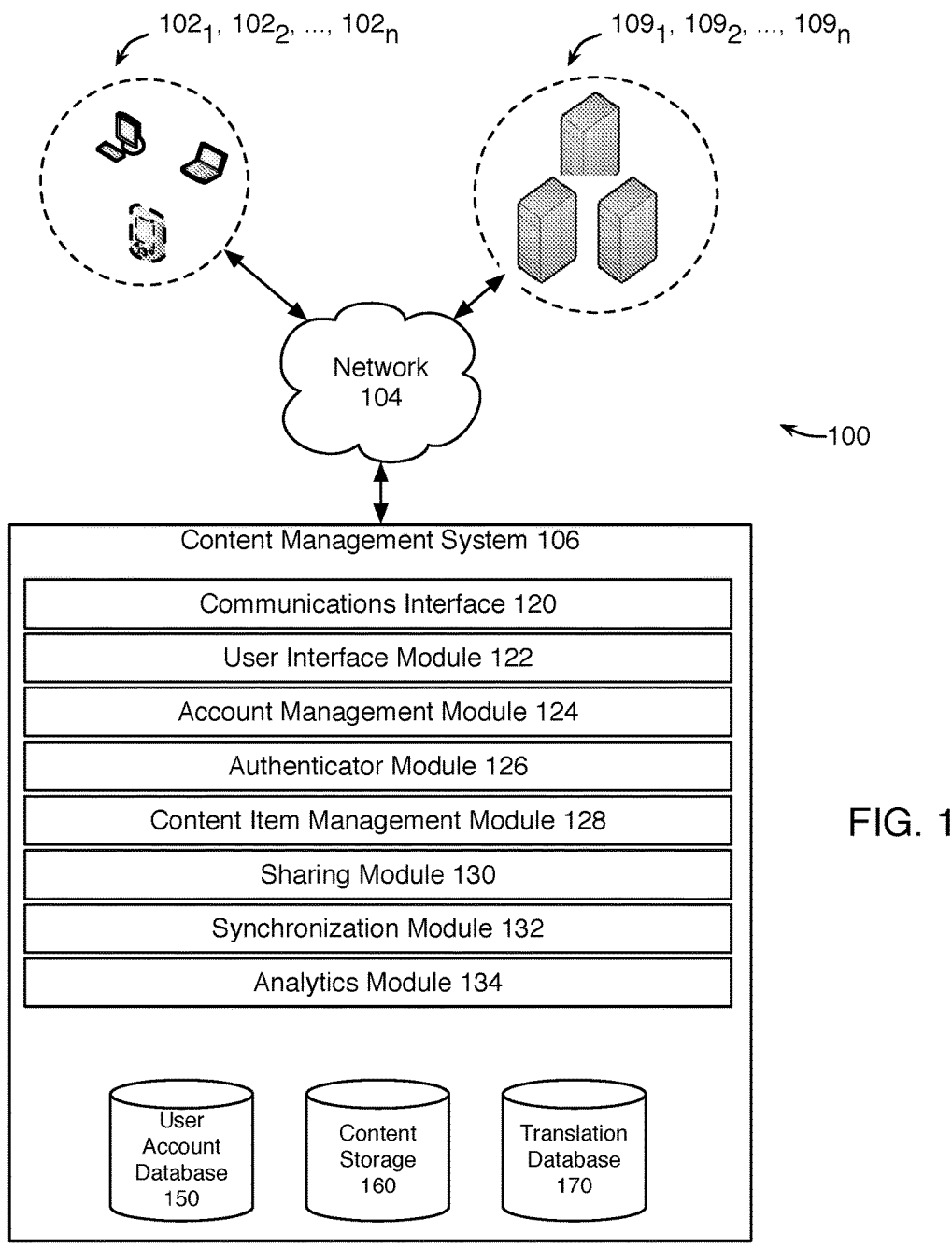
FIG. 1 shows an example configuration of devices and a network in accordance with the invention.

With respect to implementing various embodiments of the disclosed technology, an example system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, ..., $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include folders or other mechanisms of grouping content items together with different behaviors, such as collections, playlists, albums, etc. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface (e.g., graphical user interface) generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

In some embodiments, the web interface generated by user interface module 122 can include an invocation of an application programming interface (API) for translating a display item corresponding to a first language into a second language. For example, the web interface can originally be written or generated in the English language. The display items (e.g., text, images, etc.) can originally be written or generated in the English language. Without translation, display items presented on the web interface would be presented in English. However, since the web interface can be served to web clients (e.g., web browsers) around the world, translations of the English language display items can be generated for each location (i.e., locale) where the web interface might be accessed or displayed. For example, German, French, and Spanish language translations of the English display items can be generated.

In some embodiments, the various translations of a web interface display items can be stored in translation database 170, for example. Translation database 170 can include tables that map keys associated with the original English language display item to non-English language translations of the display item. Translation database 170 can store current versions and/or previous versions of the English language display item and translations of each of the previous versions of the display item in a variety of languages. When client device $102_i$ invokes the translation API of the web interface that specifies a display item and a locale, user interface module 122 can obtain a translation of the display item in a language corresponding to the specified locale. In some embodiments, the translation can correspond to a translation of a current version of the display item. In some embodiments, the translation can correspond to a previous version of the display item. User interface module 122 can send the translation to client device $102_i$. Client device $102_i$ can present the display item on the web interface in the language corresponding to the locale of client device $102_i$.

Content management system 106 can include a communications interface 120 for interfacing with various client devices 102, and can interact with other content and/or service providers $109_1, 109_2, \ldots, 109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible.

Figure 2:
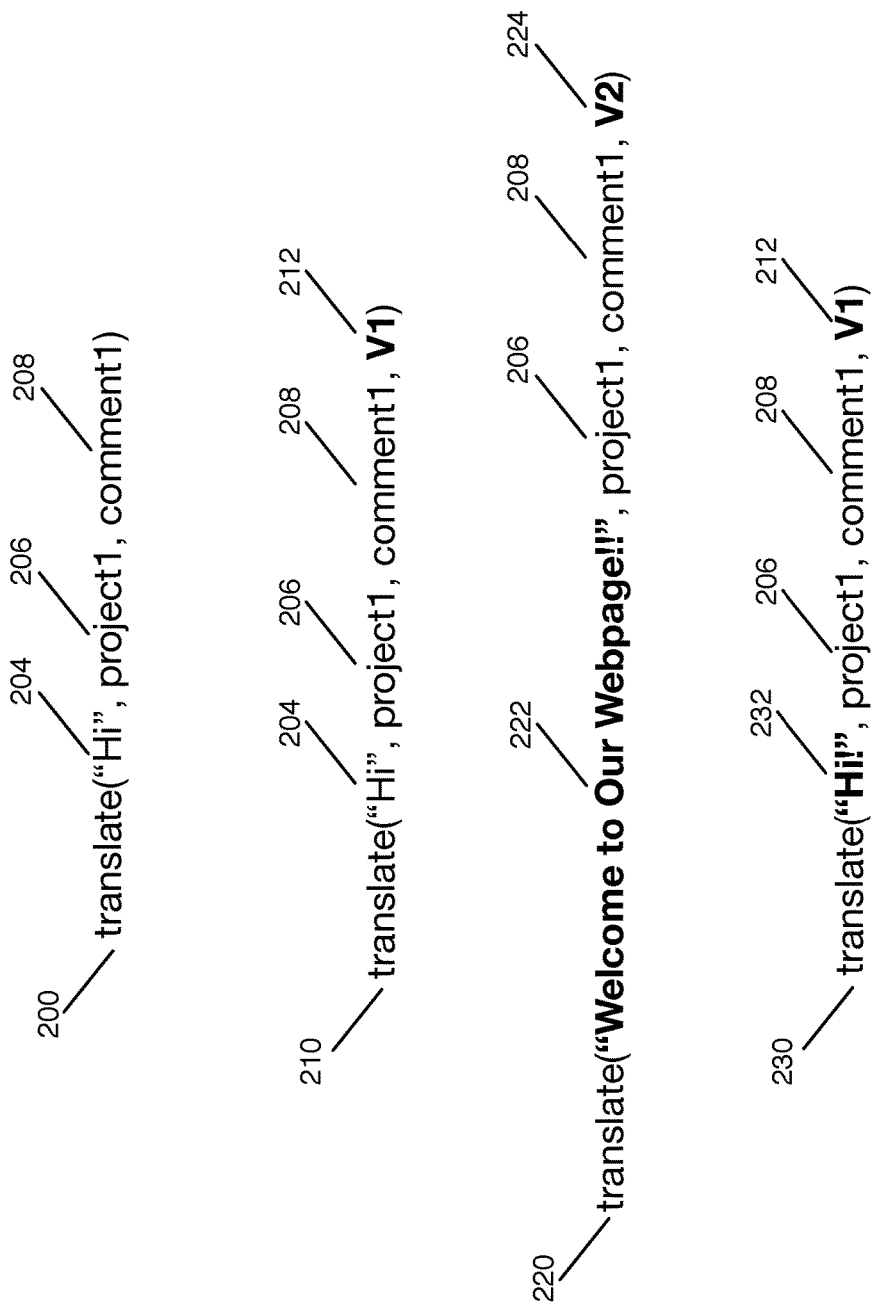
FIG. 2 illustrates example translation API invocations.

FIG. 2 illustrates example translation API invocations 200, 210, 220 and 230 that may be included in the web interface generated by user interface module 122. While the translation API represented by FIG. 2 is described with reference to a web interface and a web browser application, translation API can be invoked by any other software, such as a specialized client application specifically built for interacting with content items managed by content management system 106, for example. The translation API can be invoked by the web browser application or the specialized client application to translate display items generated in a first language into a second language corresponding to a locale or location where the display item is to be presented.

In some embodiments, an integrated development environment (IDE) can automatically modify a translation API invocation to include a fallback translation key. For example, a user-programmer can encode translation API invocation 200 into software code (e.g., java, HTML, etc.) for displaying a web interface on client device 102$_i$. Translation API invocation 200 can be parameterized with display item 204 (e.g., a string) to be translated. Display item 204 can correspond to a current version of display item 204, for example. Translation API invocation 200 can be parameterized with project identifier 206 that identifies a project or product from which the translation API will be invoked. Translation API invocation 200 can be parameterized with comment 208 that can include a context description to be used by a human translator to translate display item 204. For example, the context description can provide the human translator clues for how to provide a correct translation based on the how or where display item 204 will be displayed on the web interface. The user-programmer can encode translation API invocation 200 in the web interface when no previous version of display item 204 exists in translation database 170, for example.

In some embodiments, a software development system can convert translation API invocation 200 into translation API invocation 210. For example, the software development system can include networked workstations, servers, and databases that are used by a software development team to generate software code for displaying the web interface. The user-programmer can use an integrated development environment (IDE) executing on a workstation (e.g., computing device) in the software development system to write the software code for displaying the web interface generated by user interface module 122. When the user-developer writes the code corresponding to translation API invocation 200, the IDE can send display item 204 to a translation system (not shown) for translation by a human or a computerized translator. The IDE can cause entries in translation database 170 (e.g., version table 310 of FIG. 3) to be created that map display item 204 to keys that can be used to look up different versions of display item 204. The keys can be used to look up translations of the various versions of display item 204 (e.g., in translation table 330).

In some embodiments, the key for looking up display item 204 can be a hash value generated by hashing display item 204, project identifier 206, and/or comment 208. For example, the hash value can be generated by the software development system by providing display item 204, project identifier 206, and/or comment 208 as input values to a well-known hashing function. In some embodiments, the key for looking up display item 204 can be display item 204 itself. For example, when display item 204 is a string, the string itself can be used by database 170 as a key for locating a translation corresponding to display item 204. In some embodiments, the key for display item 204 can be randomly generated data. For example, the key can be a randomly generated number or string that is unique within database 170.

In some embodiments, once the key for display item 204 is generated, the IDE can replace translation API invocation 200 with translation API invocation 210 in the web interface code. For example, in addition to display item 204, project identifier 206 and comment 208, translation API invocation 210 can include fallback key 212. For example, when no previous version of display item 204 exists, fallback key 212 can correspond to the current version of display item 204.

As the web interface is being developed over time, a user-programmer may wish to change display item 204. For example, if display item 204 includes the text "Hi", the user-programmer may make a big change to display item 204 to include the text "Welcome to Our Webpage!!" as shown in FIG. 2 with reference to translation API invocation 220 and display item 222. If display item 204 includes the text "Hi", the user-programmer may make a small change to display item 204 to include the text "Hi!" as shown with reference to translation API invocation 230 and display item 232.

In some embodiments, when the IDE detects a change in the display item parameter of translation API invocation 210 (e.g., translation API invocation 210 becomes translation API invocation 220), the IDE can determine whether the display item change is a big change or a small change. For example, if display item 204 and display item 222 are strings, the IDE can determine how similar (or dissimilar) the two strings are. For example, the IDE can provide display item 204 (e.g., a string) and display item 222 (e.g., a string) as parameters to an edit distance algorithm that will calculate how similar or dissimilar the two display items are. When the edit distance algorithm returns a value that indicates that the display items are very dissimilar (e.g., there has been a big change or modification between display item 204 and display item 222), then a new fallback key 224 that corresponds to new display item 222 can be automatically generated and the IDE can automatically replace translation API invocation 210 with translation API invocation 220 in the web interface code. A new fallback key 224 corresponding to the new display item 222 is generated when there is a big change in a display item because the previous version of the display item, or a translation thereof, will not provide an accurate enough representation of new display item 222. Thus, a fallback key that corresponds to the previous display item 204 will not allow for retrieval of an appropriate or proximate translation.

In some embodiments, when the IDE detects a change in the display item parameter of translation API invocation 210 (e.g., translation API invocation 210 becomes translation API invocation 230), the IDE can determine whether the display item change is a big change or a small change. For example, if display item 204 and display item 232 are strings, the IDE can determine how similar (or dissimilar) the two strings are. For example, the IDE can provide display item 204 (e.g., a string) and display item 232 (e.g., a string) as parameters to an edit distance algorithm that will calculate how dissimilar the two display items are. When edit distance algorithm returns a value that indicates that the display items are similar (e.g., there has been a small change or modification between display item 204 and display item 232), then the user-programmer can leave fallback key 212 that corresponds to previous display item 204 in the translation API invocation 230 in the web interface code. Because the new display item 232 is similar to the previous display item 204, translations of display item 204 can be used as a proximate or fallback translation of display item 232 and fallback key 212 corresponding to the previous display item 204 can be used to retrieve those previous translations.

Figure 3:
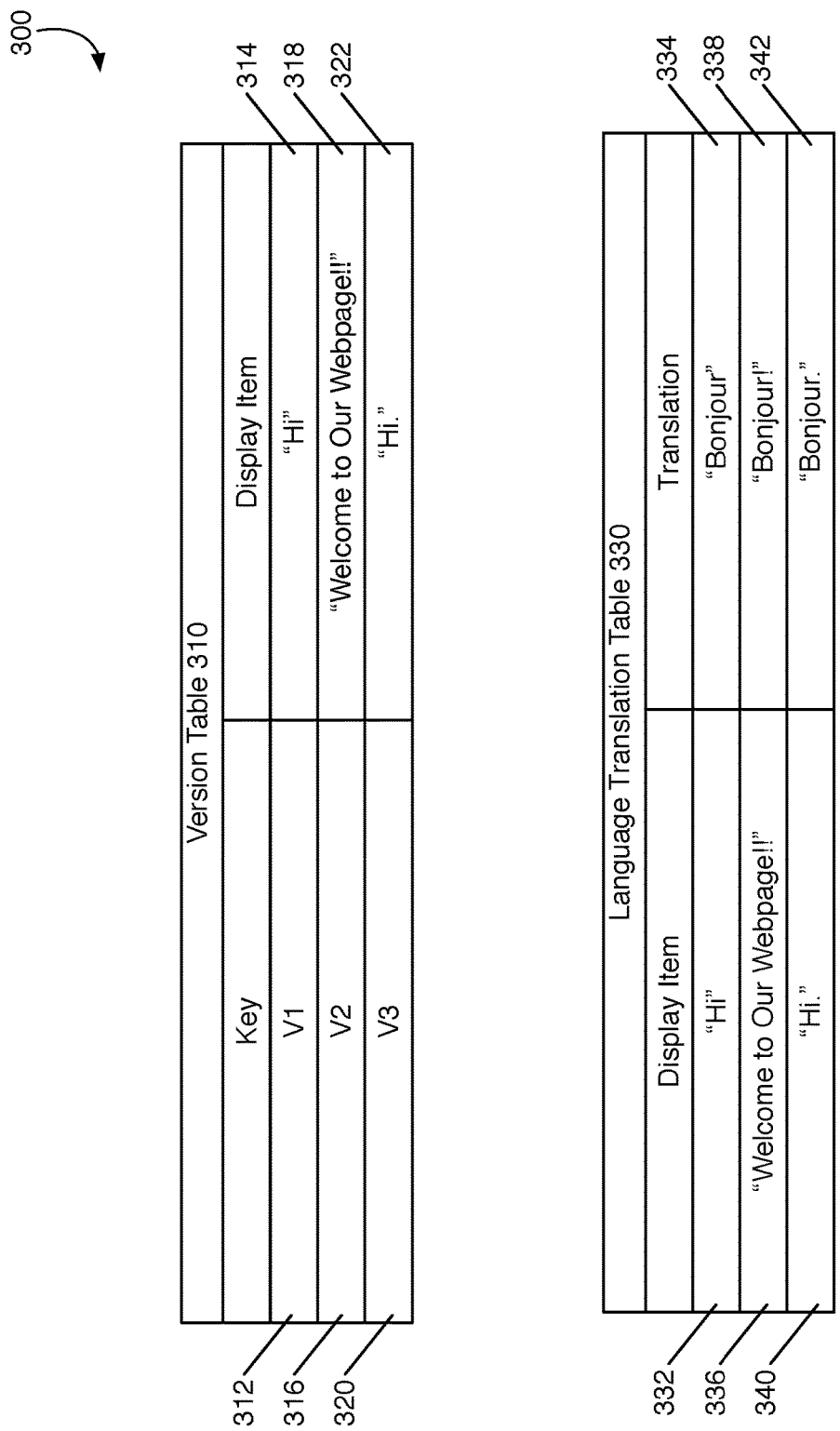
FIG. 3 illustrates example database tables stored in translation database.

FIG. 3 illustrates example database tables 300 stored in translation database 170. In some embodiments, translation database 170 can include display item version table 310. For example, version table 310 can include records that include key and display item fields that map each version of a display item 314, 318, 322 to respective keys 312, 316, 320 (e.g., fallback keys) for accessing or retrieving the corresponding version of the display item. Referring to the example from FIG. 2 above, display item 204 (e.g., "Hi") can be mapped to key 312 "V1." Display item 222 can be mapped to key 316 "V2." Display item 232 can be mapped to key 320 "V3." For example, version table 310 can be automatically populated by the IDE when the user programmer writes or modifies the translation API invocation in the code for the web interface described above.

In some embodiments, translation database 170 can include display item translation table 330. For example, translation database 170 can include a translation table 330 for each language into which a display item has been translated. In some embodiments, translation table 330 can include records that map versions of display items 332, 336, 340 to corresponding translations 334, 338, 342 of the display item versions in the language of translation table 330. For example, translation table 330 can be populated with the display item and the translation of the display item when a human or machine translator provides a translation of the corresponding display item to content management system 106.

In some embodiments, when a web browser running on client device $102_i$ invokes translation API invocation 230, the web browser will transmit display item 232 (e.g., "Hi!"), project identifier 206, comment 208, fallback key 212 (e.g., "V1"), and locale information associated with client device $102_i$ to user interface module 122 of content management system 106. For example, the locale information can be obtained from the system settings of client device $102_i$.

In some embodiments, upon receipt of display item 232, project identifier 206, comment 208, fallback key 212, and locale information from client device $102_i$, user interface module 122 can generate a key for looking up translations of display item 232 corresponding to the received locale information. In some embodiments, user interface module 122 can generate a key based solely on display item 232. For example, if display item 232 is a string, then the key can be the same string. In some embodiments user interface module 122 can generate a key based on a combination of display item 232, project identifier 206 and/or comment 208. For example, user interface module 122 can hash display item 232, project identifier 206 and/or comment 208 to generate the key.

In some embodiments, user interface module 122 can use the generated key to lookup a translation of display item 232 corresponding to the received locale information in database 170. For example, if the locale information indicates French as the local language or the configured language of client device $102_i$, then user interface module 122 can send a query to database 170 that specifies the generated key, the local language (e.g., French), and fallback key 212 as parameters for the query.

In some embodiments, database 170 can determine whether a translation exists for the generated key in the specified language. For example, database 170 can include translation tables (e.g., translation table 330) corresponding to each language into which a display item can be translated. Database 170 can include a French translation table, a German translation table, a Spanish translation table, etc., for example. When database 170 receives the generated key and the language parameter (e.g., French) from user interface module 122, database 170 can attempt to find the generated key in translation table 330, e.g., corresponding to the language parameter (e.g., the French table). When the generated key (e.g., "Hi" 332) exists in language table 330, database 170 can send the corresponding translation (e.g., "Bonjour" 334) stored in the table to user interface module 122.

When the generated key does not exist in the language table (e.g., "Hi!"), database 170 can attempt to find fallback key 212 (e.g., "V1" 312) in version table 310. When fallback key 212 exists in version table 310 (e.g., key 312), database 170 can use the corresponding display item 314 (e.g., "Hi") to look up a translation for display item 314 in language translation table 330. Once the translation corresponding to fallback key 212 has been obtained, database 170 can send the corresponding translation to user interface module 122. If neither the generated key nor fallback key 212 exists in the language table, database 170 can send user interface module 122 an error message indicating that the requested translation (e.g., translation display item 232) does not exist in the specified language table of database 170.

In some embodiments, user interface module 122 can send the translation of display item 232 (or a translation of a previous version of display item 232) to the web browser that invoked translation API 230. For example, upon receipt of the translation (e.g., French translation of display item 232), user interface module 122 can send the translation to the web browser for display on the web interface. Client device $102_i$ can then display the web interface including the translation of display item 232.

Figure 4:
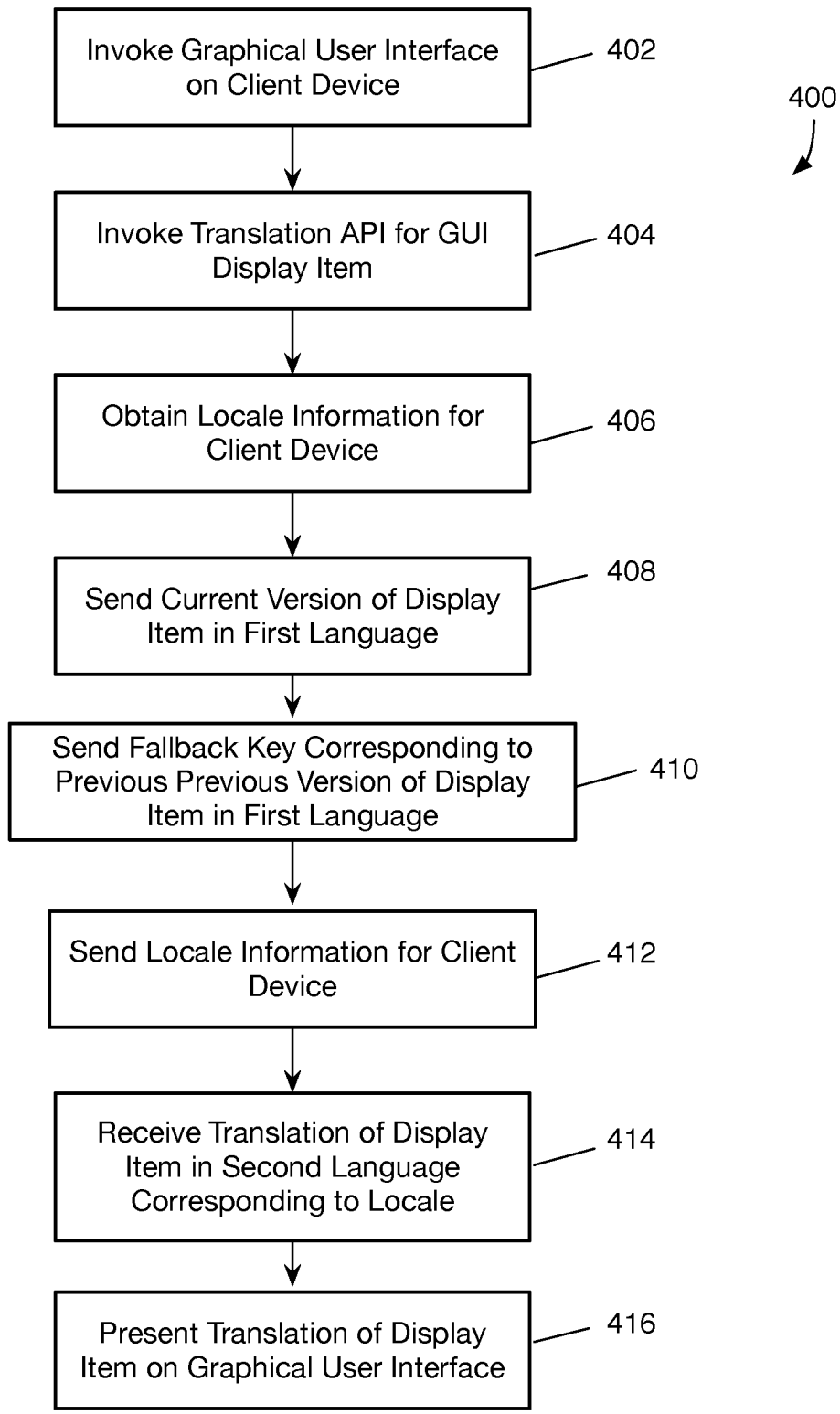
FIG. 4 is a flow diagram of an example client process for obtaining a translation of a display item using a fallback translation.

FIG. 4 is a flow diagram of an example client process 400 for obtaining a translation of a display item using a fallback translation. At step 402, client device $102_i$ can invoke a graphical user interface. For example, a user of client device $102_i$ can invoke a web interface using a web browser. The web interface can be a web interface received from and/or generated by user interface module 122, for example.

At step 404, client device $102_i$ can invoke a translation API for a display item included in the graphical user interface. For example, client device $102_i$ can invoke one of the translation APIs described with reference to FIG. 2. The translation API can be parameterized with a current display item, a project identifier, comments for translating the current display item, and a previous display item identifier (e.g., fallback key).

At step 406, client device $102_i$ can obtain locale information for client device $102_i$. For example, client device $102_i$ can obtain locale information (e.g., current location, language preferences, etc.) from configuration data or system settings of client device $102_i$ in response to the invocation of the translation API.

At step 408, client device $102_i$ can send content management system 106 the current version of the display item in a first language. For example, content management system 106 can include one or more servers configured to serve content to client device $102_i$. For example, in response to the invocation of the translation API, client device $102_i$ can send content management system 106 the current display item parameter of the translation API. The current display item can be associated (e.g., written in) a first language (e.g., English) used for developing the web interface, for example. In some embodiments, client device $102_i$ can send content management system 106 the project identifier and comments parameters of the translation API, at step 408.

At step 410, client device $102_i$ can send content management system 106 a fallback translation key corresponding to a previous version of the current display item in the first language. For example, the fallback key can be used by content management system 106 to identify a previous version of the current display item and translations thereof, as described above. The previous display item can be associated (e.g., written in) a first language (e.g., English) used for developing the web interface, for example.

At step 412, client device $102_i$ can send content management system 106 the locale information associated with client device $102_i$. For example, in response to the invocation of the translation API, client device $102_i$ can send the locale information obtained at step 406 to content management system 106.

At step 414, client device $102_i$ can receive from content management system 106 a translation of the display item in a second language corresponding to the locale of the client device $102_i$. For example, content management system 106 can receive the current display item, project identifier, comments, fallback key and/or locale information Content management system 106 can determine whether a translation exists for the current version of the display item. If a translation exists for the current version of the display item, content management system 106 can send the translation of the current version of the display item to client device $102_i$. If a translation does not exist for the current version of the display item, content management system 106 can use the fallback key to obtain a translation of a previous version of the current display item. Once a translation of the previous version of the display item is obtained by content management system 106, content management system 106 can send the translation to client device $102_i$.

At step 416, client device $102_i$ can present the translation of the display item on the graphical user interface. For example, the web browser running on client device $102_i$ can present on a display of client device $102_i$ the web interface that includes the translation of the current version or previous version of the display item.

Figure 5:
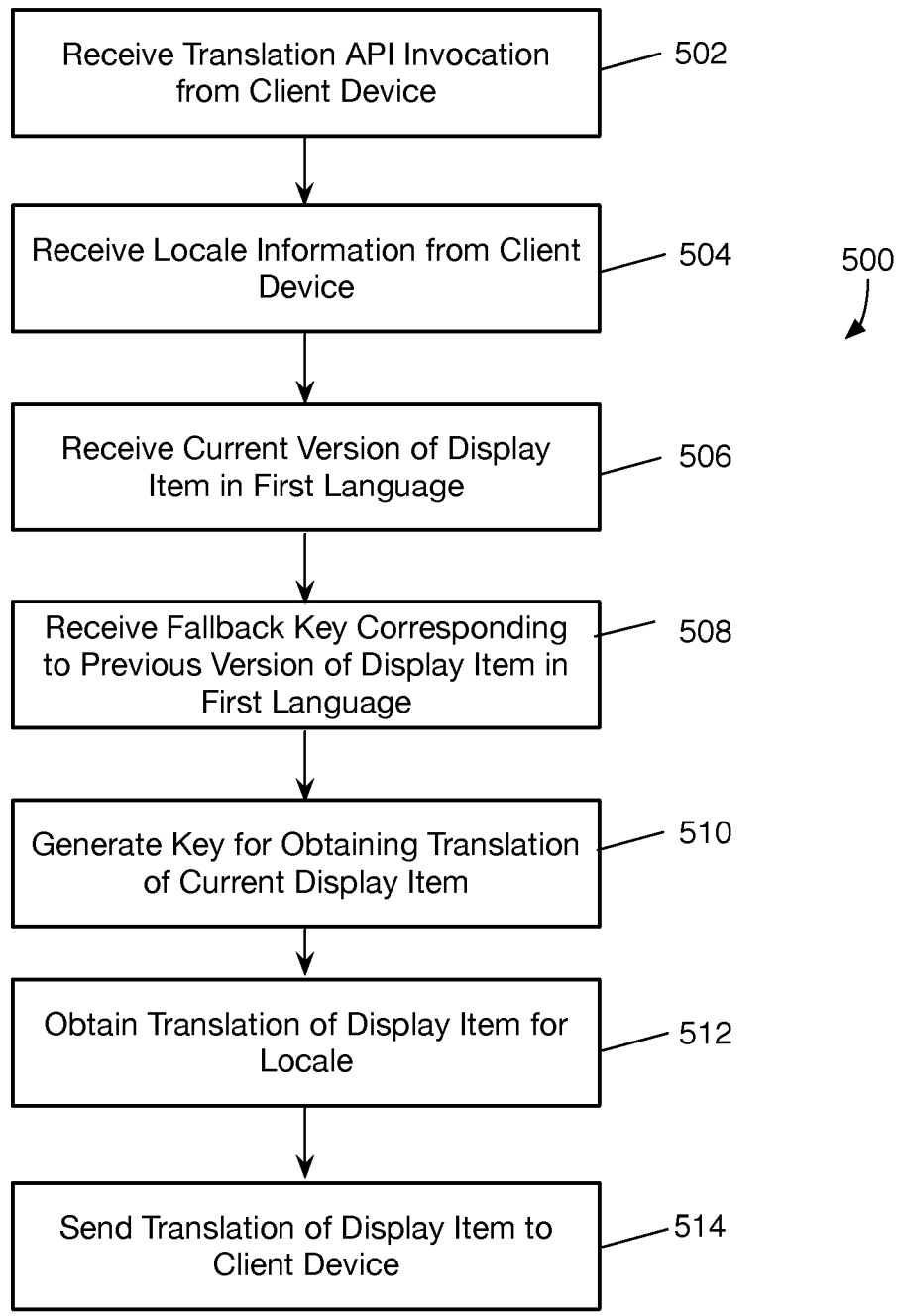
FIG. 5 is a flow diagram of an example server process for providing a translating of a display item using fallback translations.

FIG. 5 is a flow diagram of an example server process 500 for providing a translating of a display item using fallback translations. At step 502, content management system 106 can receive an invocation of a translation API from client device $102_i$. For example, a web browser can invoke the translation API when the web browser loads a web interface into the graphical user interface of the web browser. The invocation of the translation API can be included in the instructions for presenting the web interface, for example. When invoked, the translation API can send a request to content management system 106 to translate a display item included in the web interface.

At step 504, content management system 106 can receive locale information associated with client device $102_i$. For example, client device $102_i$ can send locale information for client device $102_i$ to content management system 106, as described above. Content management system 106 can receive the locale information when the translation API invocation is received, for example.

At step 506, content management system 106 can receive a current version of a display item in a first language. For example, content management system 106 can receive from a client device $102_i$ a current version of a display item to be presented on a web interface. The display item can be associated with a language (e.g., English) used for developing the web interface, for example. Content management system 106 can receive a project identifier and comments associated with the current version of the display item.

At step 508, content management system 106 can receive a fallback key corresponding to a previous version of the display item in the first language. For example, content management system 106 can receive from a client device $102_i$ a fallback key corresponding to a previous version of the display item to be presented on the web interface. The display item can be associated with a language (e.g., English) used for developing the web interface, for example.

At step 510, content management system 106 can generate a key for obtaining a translation of the current version of the display item. For example, content management system can generate a key for obtaining translations of the current display item from translation database 170. As described above, the key can be the current display item itself. The key can be a combination of the current display item, the project identifier and/or the comments. The key can be a hash value generated by hashing the current display item, the project identifier, and/or comments, as described above.

At step 512, content management system 106 can obtain a translation of the display item for the locale. For example, content management system 106 can query translation database 170 by sending translation database 170 the generated key corresponding to the current version of the display item, the fallback key corresponding to a previous version of the display item, and the locale of client device $102_i$. In response to the query, translation database 170 can determine whether a translation exists for the generated key and/or the fallback key in translation database 170 for the locale. Translation database 170 can return to content management system 106 a translation corresponding to the generated key when the generated key exists (e.g., a translation of the current version of the display item exists) in the translation database for the locale. Translation database 170 can return to content management system 106 a translation of the display item corresponding to the fallback key when the fallback key exists (e.g., a translation of a previous version of the display item exists) in the translation database for the locale. Translation database 170 can return an error message when neither the generated key nor the fallback key exists in translation database 170 for the specified locale.

At step 514, content management system 106 can send the translation of the display item to client device 102$_i$. For example, content management system can send a reply to the translation API invocation received at step 502 to client device 102$_i$ that includes the translation of the current version of the display item corresponding to the generated key obtained at step 512. Content management system can send a reply to the translation API invocation received at step 502 to client device 102$_i$ that includes the translation of the previous version of the display item corresponding to the generated key obtained at step 512. Thus, content management system can provide a translation of a previous version of a display item when a translation of the current version of a display item has not been generated or is not available.

Figure 6A:
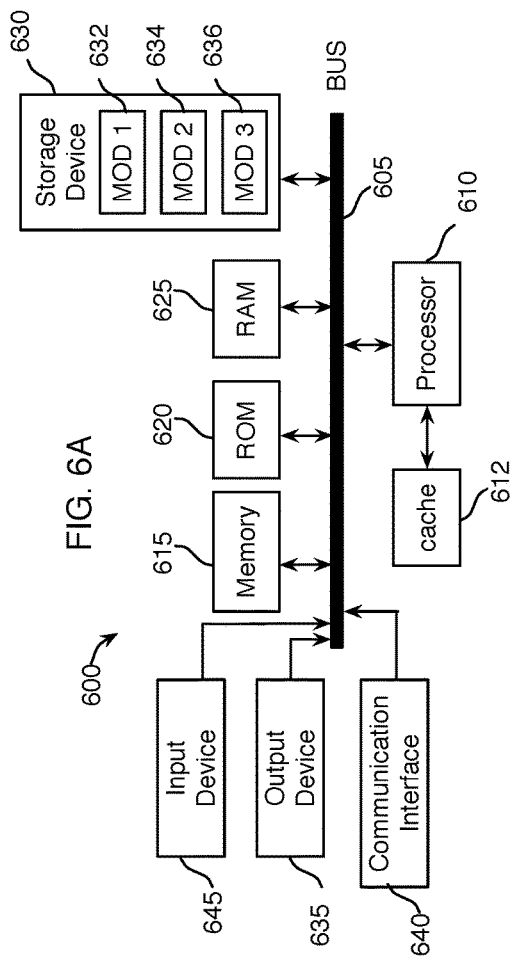
FIG. 6A shows an example system embodiment for implementing various embodiments of the present technology.
Figure 6B:
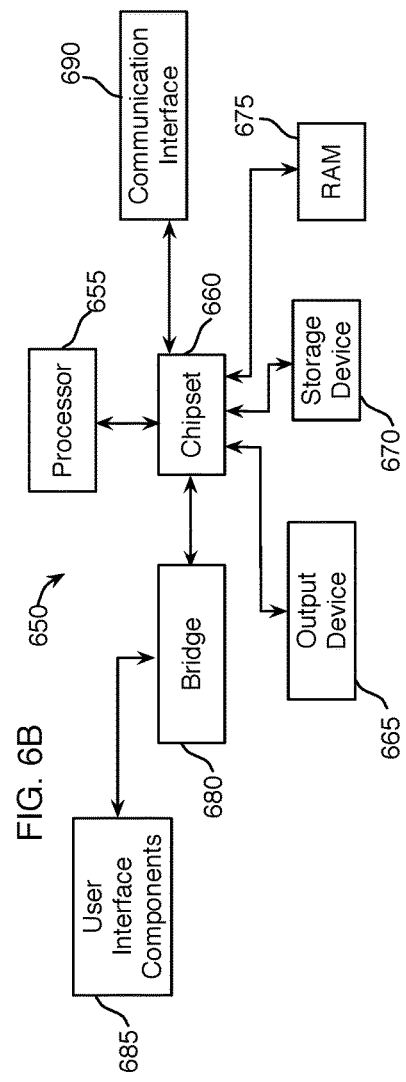
FIG. 6B shows an example system embodiment for implementing various embodiments of the present technology.

6A and FIG. 6B show example system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Example system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that example systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer implemented method comprising:
   detecting a change in a previous display item, wherein the previous display item is associated with a translation key and the change results in a current display item;
   determining a similarity between the previous display item and the current display item using an edit distance algorithm;
   when a content management system determines, based on the similarity, that the previous display item and the current display item are similar:
   designating the translation key as a fallback key based on the similarity between the current display item and the previous display item;
   receiving, at the content management system from a client device, an API invocation including the current display item associated with the client device, the fallback key, and a language associated with the client device;
   generating, at the content management system, a generated key for the current display item, wherein the generated key and the fallback key are different;
   receiving, from the client device by the content management system, a request to translate the current display item in the language associated with the client device and send the translation of the current display item to the client device for presentation at the client device;
   determining, at the content management system, in response to the request and based on the generated key that a translation of the current display item is not available in the language associated with the client device;
   determining at the content management system based on the fallback key that a translation of the previous display item in the language associated with the client device is available; and
   sending, from the content management system to the client device, the translation of the previous display item based on the fallback key in the language associated with the client device in lieu of the translation of the current display item associated with the request; and
   when the content management system determines, based on the similarity, that the previous display item and the current display item are dissimilar:
   determining that the current display item is a new display item;
   generating a new fallback key for the new display item;
   replacing the API invocation; and
   storing the new fallback key in association with the new display item.

2. The computer implemented method of claim 1, further comprising associating the translation of the previous display item based on the fallback key with the current display item.

3. The computer implemented method of claim 1, wherein the current display item comprises a project identifier and comments for translating the current display item.

4. The computer implemented method of claim 1, further comprising:
   generating the generated key corresponding to the current display item by hashing information associated with the current display item.

5. The computer implemented method of claim 4, further comprising:
   determining, based on the generated key, that the translation of the current display item in the language does not exist in a translation database.

6. The computer implemented method of claim 1, wherein the previous translation based on the fallback key of the current display item in the language is obtained from a translation database.

7. A non-transitory computer readable medium including one or more instructions which, when executed by one or more processors, cause the one or more processors to:
   detect a change in a previous display item, wherein the previous display item is associated with a translation key and the change results in a current display item;

determine a similarity between the previous display item and the current display item using an edit distance algorithm;

when a content management system determines, based on the similarity, that the previous display item and the current display item are similar:

designate the translation key as a fallback key based on the similarity between the current display item and the previous display item;

receive, at the content management system from a client device, an API invocation including the current display item in a first language, the fallback key, and a second language associated with the client device;

generate, at the content management system, a generated key for the current display item, wherein the generated key and the fallback key are different;

receive, from the client device by the content management system, a request to translate the current display item in the first language and send the translation of the current display item to the client device for presentation at the client device;

determine, at the content management system, in response to the request and based on the generated key that the translation of the current display item is not available in the second language;

determine at the content management system based on the fallback key that a translation of the previous display item in the second language associated with the client device is available;

obtain the translation based on the fallback key of the previous display item in the second language when a translation of the current display item in the second language based on the generated key is unavailable; and send, from the content management system, the translation of the previous display item based on the fallback key in the second language to the client device in lieu of the translation of the current display item associated with the request; and when the content management system determines, based on the similarity, that the previous display item and the current display item are dissimilar:

determine that the current display item is a new display item;

generate a new fallback key for the new display item;

replace the API invocation; and store the new fallback key in association with the new display item.

8. The non-transitory computer readable medium of claim 7, storing additional instructions which, when executed by the one or more processors, cause the one or more processors to associate the translation based on the fallback key with the current display item.

9. The non-transitory computer readable medium of claim 7, wherein the current display item comprises a project identifier and comments for translating the current display item.

10. The non-transitory computer readable medium of claim 7, wherein the instructions cause the one or more processors to:

generate the generated key associated with the current display item based on a hashing algorithm.

11. The non-transitory computer readable medium of claim 10, wherein the instructions cause the one or more processors to:

determine, based on the generated key, that the translation of the current display item in the second language does not exist in a translation database.

12. The non-transitory computer readable medium of claim 7, wherein the translation based on the fallback key in the second language is obtained from a translation database associated with the content management system.

13. A system comprising:

one or more processors; and at least one non-transitory computer readable medium including one or more instructions which, when executed by the one or more processors, cause:

detecting a change in a previous version of a current display item, wherein the previous version of the current display item is associated with a translation key and the change results in the current display item;

determining a similarity between the previous version of the current display item and the current display item using an edit distance algorithm;

when a content management system determines, based on the similarity, that the previous version of the current display item and the current display item are similar:

designating the translation key as a fallback key based on the similarity between the current display item and the previous version of the current display item;

receiving, at the content management system from a client device, an API invocation including the current display item in a first language to be displayed on the client device;

receiving the fallback key, in the API invocation, corresponding to the previous version of the current display item in the first language to be displayed on the client device;

generating, at the content management system, a generated key for the current display item, wherein the generated key and the fallback key are different;

receiving, from the client device by the content management system, a request to translate the current display item in the first language and send the translation of the current display item to the client device for presentation at the client device;

identifying a second language associated with the client device;

determining at the content management system that a first translation based on the generated key of the current display item in the second language is not available;

determining at the content management system, in response to the request and based on the fallback key, that a second translation of the previous version of the current display item in the second language is available; and sending from the content management system, the second translation based on the fallback key to the client device in lieu of the translation of the current display item associated with the request; and when the content management system determines, based on the similarity, that the previous display item and the current display item are dissimilar:

determining that the current display item is a new display item;

generating a new fallback key for the new display item;

replacing the API invocation; and storing the new fallback key in association with the new display item.

14. The system of claim 13, the at least one non-transitory computer readable medium storing additional instructions which, when executed by the one or more processors, cause the one or more processors to associate the second translation with the current display item.

15. The system of claim 13, wherein receiving the current display item comprises receiving a project identifier associated with the current display item and comments for translating the current display item.

16. The system of claim 13, wherein the instructions which, when executed by the one or more processors, cause the one or more processors to:
   generate the generation key corresponding to the current display item based on a hashing algorithm.

17. The system of claim 16, wherein the instructions which, when executed by the one or more processors, cause the one or more processors to:
   determine, based on the generated key, that the first translation of the current display item in the second language does not exist in a translation database.

18. The system of claim 13, wherein the second translation based on the fallback key in the second language is obtained from a translation database.

\* \* \* \* \*